(12) United States Patent
Awater et al.

(10) Patent No.: US 8,023,397 B2
(45) Date of Patent: *Sep. 20, 2011

(54) JOINT PACKET DETECTION IN A WIRELESS COMMUNICATION SYSTEM WITH ONE OR MORE RECEIVERS

(75) Inventors: Geert Arnout Awater, Utrecht (NL); James Gardner, San Ramon, CA (US); Richard Van Nee, De Meern (NL); Gregory C. Steele, Fremont, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/554,438

(22) Filed: Sep. 4, 2009

(65) Prior Publication Data

US 2010/0061262 A1 Mar. 11, 2010

Related U.S. Application Data

(63) Continuation of application No. 10/642,070, filed on Aug. 15, 2003, now Pat. No. 7,586,884.

(51) Int. Cl.
*H04J 11/00* (2006.01)
(52) U.S. Cl. ........ 370/208; 370/338; 370/487; 702/179; 455/575.7; 375/150; 700/53
(58) Field of Classification Search .......... 370/203–211, 370/310, 338, 339, 476, 487, 490; 375/130, 375/141–143, 147, 150; 455/552.1, 562.1, 455/575.7, 279.1, 33.3; 700/53
See application file for complete search history.

(56) References Cited

U.S. PATENT DOCUMENTS

| 5,131,006 | A | 7/1992 | Kamerman et al. |
| 5,694,421 | A | 12/1997 | Park |
| 6,226,508 | B1 | 5/2001 | Takahashi et al. |
| 7,123,662 | B2 | 10/2006 | Li et al. |
| 7,190,748 | B2 | 3/2007 | Kim et al. |
| 7,647,069 | B2 * | 1/2010 | Zhang ................ 455/552.1 |
| 2002/0012411 | A1 | 1/2002 | Heinzl |
| 2002/0122511 | A1 | 9/2002 | Kwentus et al. |

(Continued)

FOREIGN PATENT DOCUMENTS

EP 0646992 A 4/1997

(Continued)

OTHER PUBLICATIONS

Office Action for Japanese Patent Application Serial No. 2008-502955 dated Jun. 1, 2010, 4 pages.

(Continued)

*Primary Examiner* — Kwang B Yao
*Assistant Examiner* — Jeffrey M Rutkowski
(74) *Attorney, Agent, or Firm* — Turocy & Watson, LLP

(57) ABSTRACT

A packet detector joint detects 802.11a packets, 802.11b packets and interference that is within a monitored frequency range but is not formatted as 802.11a packets or 802.11b packets. The packet detector can use signals from one or more antennas. Detection of signals is done using differentially detected correlations. In addition to packet detection, the packet detector can identify signal levels, noise levels and locations of narrowband interference. The process of packet detection and identifying other indicators can be done simultaneously and as the signal is being received.

33 Claims, 10 Drawing Sheets

U.S. PATENT DOCUMENTS

| | | | |
|---|---|---|---|
| 2003/0072397 A1 | 4/2003 | Kim et al. | |
| 2003/0236108 A1 | 12/2003 | Li et al. | |
| 2004/0001430 A1 | 1/2004 | Gardner | |
| 2004/0005022 A1 | 1/2004 | Zhu et al. | |
| 2004/0030530 A1* | 2/2004 | Li et al. | 702/179 |
| 2004/0032825 A1 | 2/2004 | Halford et al. | |
| 2004/0048574 A1 | 3/2004 | Walker et al. | |
| 2004/0052231 A1 | 3/2004 | Ramaswamy et al. | |
| 2004/0071104 A1 | 4/2004 | Boesel et al. | |
| 2004/0116112 A1 | 6/2004 | Gray | |
| 2004/0204026 A1* | 10/2004 | Steer et al. | 455/575.7 |
| 2004/0240402 A1 | 12/2004 | Stephens | |
| 2004/0258025 A1 | 12/2004 | Li et al. | |
| 2004/0266375 A1 | 12/2004 | Li | |
| 2005/0002327 A1 | 1/2005 | Li | |
| 2005/0018754 A1 | 1/2005 | Song | |
| 2005/0047384 A1 | 3/2005 | Wax | |
| 2005/0233709 A1 | 10/2005 | Gardner et al. | |
| 2006/0013180 A1 | 1/2006 | Gupta et al. | |
| 2006/0013327 A1 | 1/2006 | Sugar | |
| 2007/0117523 A1 | 5/2007 | Weber et al. | |

FOREIGN PATENT DOCUMENTS

| | | |
|---|---|---|
| EP | 0657968 A | 1/1999 |
| JP | 07211392 A | 8/1995 |
| JP | 2003-169008 | 6/2003 |
| JP | 2004-153529 | 5/2004 |
| JP | 2004-214726 | 7/2004 |
| JP | 2004-289373 | 10/2004 |
| JP | 2004-328267 | 11/2004 |
| JP | 2005-528002 | 9/2005 |
| WO | 0105088 | 1/2001 |
| WO | 2004027921 A | 4/2004 |
| WO | 2005/022760 A1 | 3/2005 |

OTHER PUBLICATIONS

ISR dated Feb. 3, 2006 for PCT Application Serial No. PCT/US2005/009341, 2 pages.

European OA dated Jan. 24, 2008 for EP Application Serial No. 05 729 464.7-2415, 2 pages.

European OA dated Aug. 19, 2008 for EP Application Serial No. 05 729 464.7-2415, 17 pages.

Office Action mailed Feb. 19, 2010 for European Patent Application No. 05729464.7, 45 pages.

Chinese Office Action mailed Sep. 1, 2010 for Chinese Patent Application No. 200580049854.8, 27 pages.

Chinese Office Action mailed Feb. 28, 2011 for Chinese Patent Application No. 200580049854.8, 26 pages.

* cited by examiner

JOINT PACKET DETECTION IN A WIRELESS COMMUNICATION SYSTEM WITH ONE OR MORE RECEIVERS

RELATED APPLICATIONS

This application is a Continuation of U.S. patent application Ser. No. 10/642,070, filed Aug. 15, 2003 and entitled "JOINT PACKET DETECTION IN WIRELESS COMMUNICATION SYSTEM WITH ONE OR MORE RECEIVER", the entirety of which is incorporated herein by reference.

BACKGROUND

Wireless networks have become increasingly popular, as computers and other devices can be coupled for data communications without requiring wired connections between the network nodes. One set of standards for wireless networks is the IEEE 802.11 standards, but other wireless standards or protocols might be used instead. In the IEEE 802.11 standards, there are at least two widely-used standards, 802.11a and 802.11b, and communication systems and devices might be required to support both standards and/or be required to operate in areas where both are being used.

Interference among the two standards can be avoided, as they operate in different frequency ranges. However, recent additions such as the 802.11g standard allow for OFDM transmissions (802.11a is an OFDM transmission protocol) in the 2.4 GHz band where 802.11b direct-sequence spread-spectrum transmissions might be present. The fact that packets with different modulations can be present within the same network creates difficulties in the design of 802.11 packet detection circuits, as they have to detect the presence of a packet with a fraction of its preamble and it has to indicate whether, the packet is an 802.11a packet or an 802.11b packet with a very low probability of error.

Prior to decoding bits having information content provided by a transmitter, a receiver typically senses a packet being transmitted and then performs steps to characterize the channel, synchronize with the transmitted packet, and the like. Packet detection is a process of determining that a packet is present on the channel (i.e., it is being, or has been, transmitted by a transmitter), determining the type of packet it is (at least to the extent needed to perform further processing on the packet or its contents) and to activate receiver components as needed to handle further processing. In some receivers, the receive logic is implemented in digital signal processing (DSP) commands provided to a DSP processor. Where the logic that implements data processing of received packet data is implemented as instructions, those instructions can remain unexecuted until a packet detector indicates that the received signal contains a packet to be further processed. Where the logic that implements data processing of received packet data is implemented as hardwired circuitry, the receiver can be configured to remove or lower the power to such hardwired circuitry until a packet detector indicates that the received signal contains a packet to be further processed. In either case, processing power and/or computing effort is preserved when no packets are detected. This saves power and/or processing requirements, which are often constrained in wireless receivers, but requires packet detection. So that portions of the packet are not lost, the receiver should detect an existence of a packet and take any actions needed to start packet processing before essential elements of the packet are missed. Therefore, packet detection should be efficient and quick.

In addition to the problem of possibly overlapping 802.11 signals, an 802.11 receiver must also deal with narrowband non-802.11 signals, such as Bluetooth, scientific equipment, medical equipment or microwave ovens, and the receiver's packet detector should preferably not cause false triggers on such interference. Aside from the interference issues and packet detection issues, a receiver that must receive and process both 802.11a and 802.11b signals cannot use a simple common sampling scheme, as conventional 802.11a receivers operate at a 20 MHz sampling rate, while conventional 802.11b receivers operate at a sampling rate of 22 MHz.

A typical node in a wireless network includes a receive chain and a transmit chain and each chain uses only one antenna at a time. However, with multiple input, multiple output (MIMO) communication systems, more than one transmitter antenna and/or more than one receiver antenna is used, with each transmitter antenna possibly transmitting different bit streams as other transmitter antennas and each receiver antenna preferably receiving at least a slightly different input from the channel than other receiver antennas.

MIMO communication systems are known in the art. Such systems generally include a transmitter having a number ($M_t$) of transmit antennas communicating with a receiver having a number ($M_r$) of receive antennas, where $M_r$ and $M_t$ may or may not be equal. In some keying schemes, bits of data to be transmitted are grouped and each group of bits is mapped to a symbol (a particular combination of phase and amplitude) in a signaling constellation. A number of constellations are known in the art, including binary phase-shift keying (BPSK), quadrature phase-shift keying (QPSK), and quadrature amplitude modulation (QAM) constellations. In a MIMO communication system, each of the $M_t$ transmit antenna transmits, at substantially the same time, a symbol representing a different group of bits. Thus, if each symbol represents B bits, the number of bits transmitted per channel "period" is $B*M_t$.

Each receive antenna receives a signal that is a combination of signals from the transmit antennas, modified by channel properties (e.g., fading and delay) and noise. The receiver decodes (i.e., reconstructs) the $M_t$ transmitted signals from the $M_r$ received signals using its knowledge of the possible transmitted symbols and the properties of the communication channel. Because of the improved reception abilities of multiple antenna systems, they are often expected to receive signals with lower signal-to-noise ratios (SNR) than other systems. With a wider expected operating range in terms of SNR, correct packet detection is expected at lower SNRs, making many conventional packet detection schemes unsuitable.

It would be desirable to overcome the shortcomings of the prior art described above.

SUMMARY

In one embodiment of a wireless receiver, a packet detector jointly detects 802.11a packets, 802.11b packets and interference that is within a monitored frequency range but is not formatted as 802.11a packets or 802.11b packets. The packet detector can use signals from one or more antennas. Detection of signals is done using differentially detected correlations. In addition to packet detection, the packet detector can identify signal levels, noise levels and locations of narrowband interference. The process of packet detection and identifying other indicators can be done simultaneously and as the signal is being received.

BRIEF DESCRIPTION OF THE DRAWINGS

FIG. 10 is a set of plots showing performance of one embodiment of a packet detector described above;

DETAILED DESCRIPTION

Figure 1:
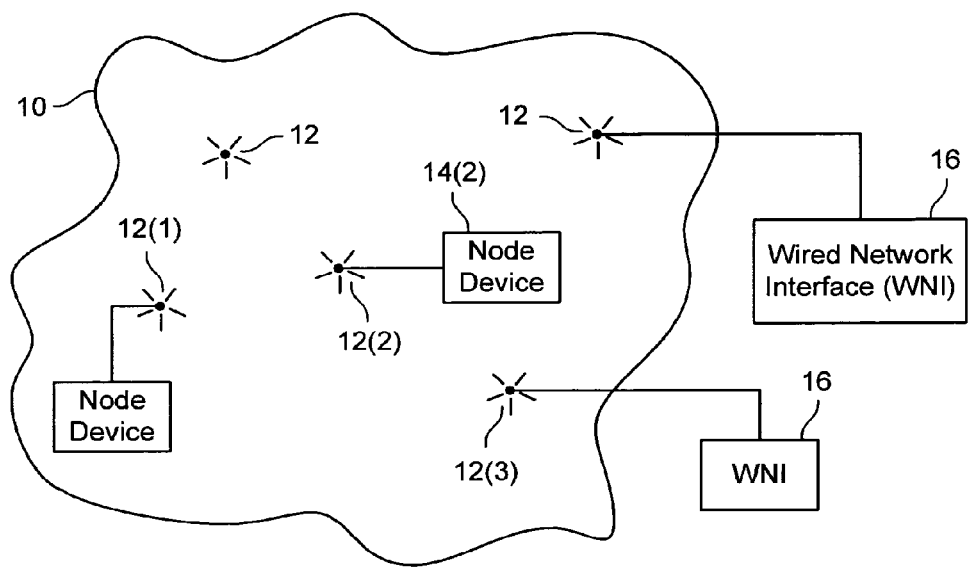
FIG. 1 is a block diagram of a simple wireless network that might use the ideas presented herein.

FIG. 1 illustrates a simple wireless network that might use the ideas presented herein. As shown in FIG. 1, a wireless network 10 comprises a plurality of nodes 12 wherein each node 12 is capable of communicating with at least one other node 12 of wireless network 10. In specific implementations, wireless network 10 comprises a local area wireless network, as might be used within a building, campus, vehicle or similar environments.

In a specific embodiment, wireless network 10 is designed to be compliant with one or more of the IEEE 802.11 standards. However, it should be understood that other standards and nonstandard networks might be substituted therefore to solve problems similar to those solved in the 802.11 environment. For example, the IEEE 802.11g standard contemplates different signals than the 802.11a or 802.11b standards and the 802.11 set of standards might be further modified for later developments. Thus, while many of the examples described herein solve the problem of detecting packets (and other tasks) in an environment where 802.11a and 802.11b packets are present, possibly with other interfering signals, the teachings of this disclosure can be used for a system where two other protocol standards are used, with or without the unwanted interference. In one example, at least one of the protocols is an extended 802.11a protocol usable between devices that support the protocol.

As shown, some of the nodes are coupled to node devices 14, while other nodes are coupled to wired network interfaces 16. For example, node 12(2) is coupled to node device) 14(2), while node 12(3) is coupled to a wired network interface 16. FIG. 1 is intended to be a simplified and generalized diagram of a wireless network. Interfering signal generators are not shown, but are assumed to be present.

Examples of node devices 14 include laptops, personal digital assistants (PDAs), or any other portable or semi-portable electronic device needing to communicate with other devices, or a stationary electronic device needing to communicate with other devices where a wire connection to a network or the other devices is not available or easily provided. Wired network interfaces 16 couple their respective nodes to a network. Examples of such networks include the Internet, a local area network (LAN) or a public or private connection to a TCP/IP packet network or other packet network or networks.

In a typical operation, a plurality of node devices are outfitted with circuitry and/or software that implements a node 12 functionality and one or more network access points are provided in wireless network 10 to provide access between such a node device and the network to which a wired network interface is coupled. In the terminology used here, a node coupled to a node device is referred to as a "station" and a node coupled to a wired network interface is referred to as an "access point". Just one example of the uses of such a system is to connect computers within a building to a network without requiring network wires to be run to each computer. In that example, the building would be outfitted with stationary access points coupled to the network which are within wireless communication range of wireless network cards in each of the stations coupled to the network.

Figure 2:
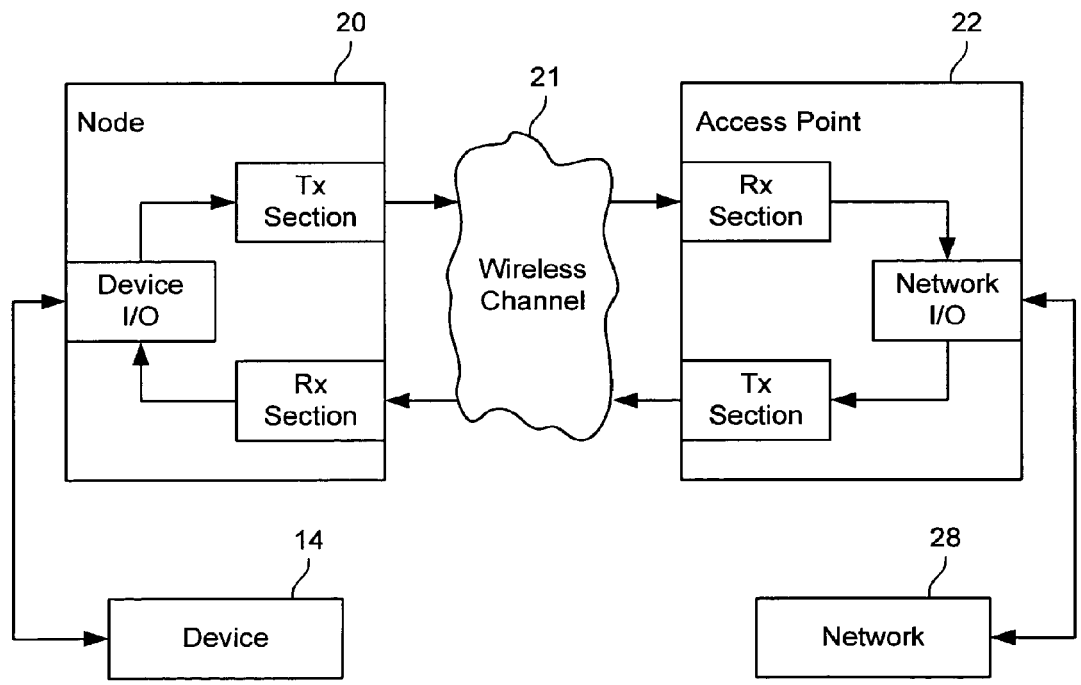
FIG. 2 is a block diagram illustrating the coupling between one device and one network connection of the wireless network shown in FIG. 1.

FIG. 2 shows in more detail the coupling between one device and one network connection. As shown there, node device 14 is coupled to a device I/O section of node hardware 20. Node hardware 20 includes a transmit section and a receive section, each coupled to the device I/O section. The transmit section transmits a signal through a wireless channel 21 to a receive section of access point hardware 22. That receive section is coupled to a network I/O section, thus providing a data communication path from device 14 to a network 28. A path from network 28 to device 14 is also provided via the network I/O section of access point hardware 22, a transmit section of access point hardware 22, a receive section of node hardware 20 and the device I/O section of node 20. The characteristics of wireless channel 21 depend on many factors, such as the location of node hardware 20 and access point hardware 22 as well as intervening objects, such as walls, buildings and natural obstructions, as well as influences by other devices and transmitters and receivers and signal-reflecting surfaces.

Typically node hardware 20 can be integrated in with device 14. For example, where device 14 is a laptop computer, node hardware 20 might be an add-on PCMCIA card that is inserted into the laptop's PCMCIA slot. Typically access point hardware 22 is implemented as part of a wired network interface device that is just used to couple a wired network to a wireless network. Notwithstanding the typical implementation, it should be understood that nothing here prevents the diagram of FIG. 2 from being entirely symmetrical, i.e., wherein node hardware 20 and access point hardware 22 are nearly identical instances of hardware devices.

Figure 3:
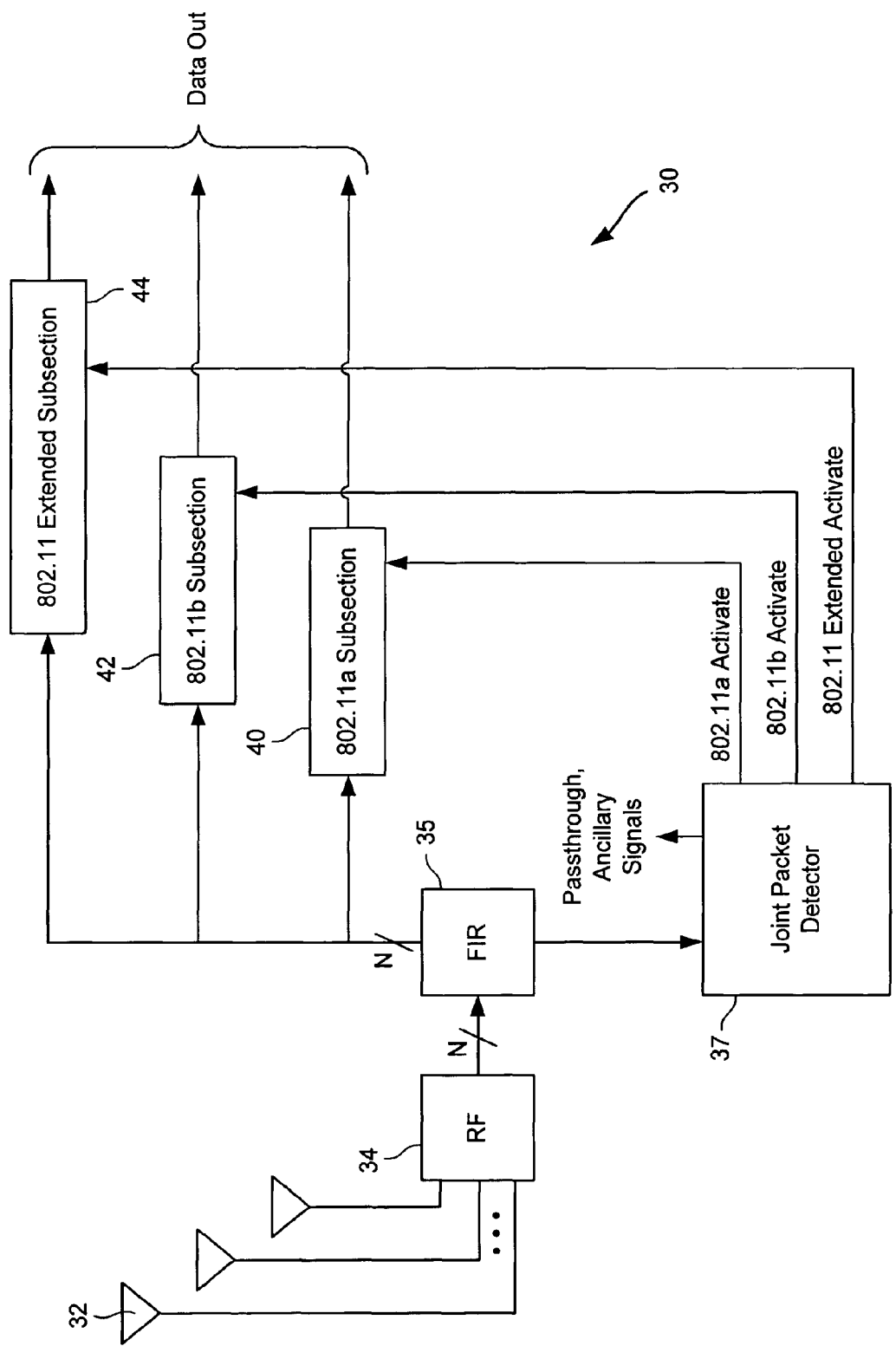
FIG. 3 is a block diagram of a receive section of node hardware as might be used in hardware illustrated in FIG. 2.

What follows is a detailed description of a receive section. FIG. 3 illustrates components of a receive section 30. Receive section 30 receives one or more signals over the wireless channel via antennas 32, which are initially processed by RF section 34. RF section 34 might, for example, process the signals to form baseband signals to form digital signal streams. As shown, receive section 30 also might include FIR(s) 35 and various subsections 40, 42, 44 for processing 802.11a, 802.11b and 802.11 extended signals, respectively. Receive section 30 also includes a joint packet detector 37 described in more detail below. Further details of elements of receive section 30 may be found in U.S. patent application Ser. No. 10/068,360 entitled "Multi-Antenna Wireless Receiver Chain with Vector Decoding", assigned to the assignee of the present application and incorporated herein. It should be understood that the present invention is not limited to the particular receiver implementations shown here or there.

Joint packet detector 37 processes input signals to determine the beginning of a packet and may provide a packet detector signal to other elements, such as subsections 40, 42, and 44, to indicate whether any further processing. Where receive section 30 is implemented as instructions for a digital signal processor, joint packet detector 37 might be implemented as code that determines whether or not a packet is detected and then sets a flag that the processor uses to determine whether to execute code for the other blocks shown. FIG. 3 shows multiple detect signals being provided, possibly along with other signals ("ancillary signals" used by other elements as well as joint packet detector 37 and "pass-through signals" generated but not used directly by joint packet detector 37) derived from some of the same processing. While subsections 40, 42 or 44 might operate at "native" sample rates that are specific to processes handled therein, joint packet detector 37 can operate at a common sampling rate, such as 20 MHz, even when that sample rate is not the "native" sample rate for the protocol in which packets are being detected. This allows for a more efficient joint packet detector.

Figure 4:
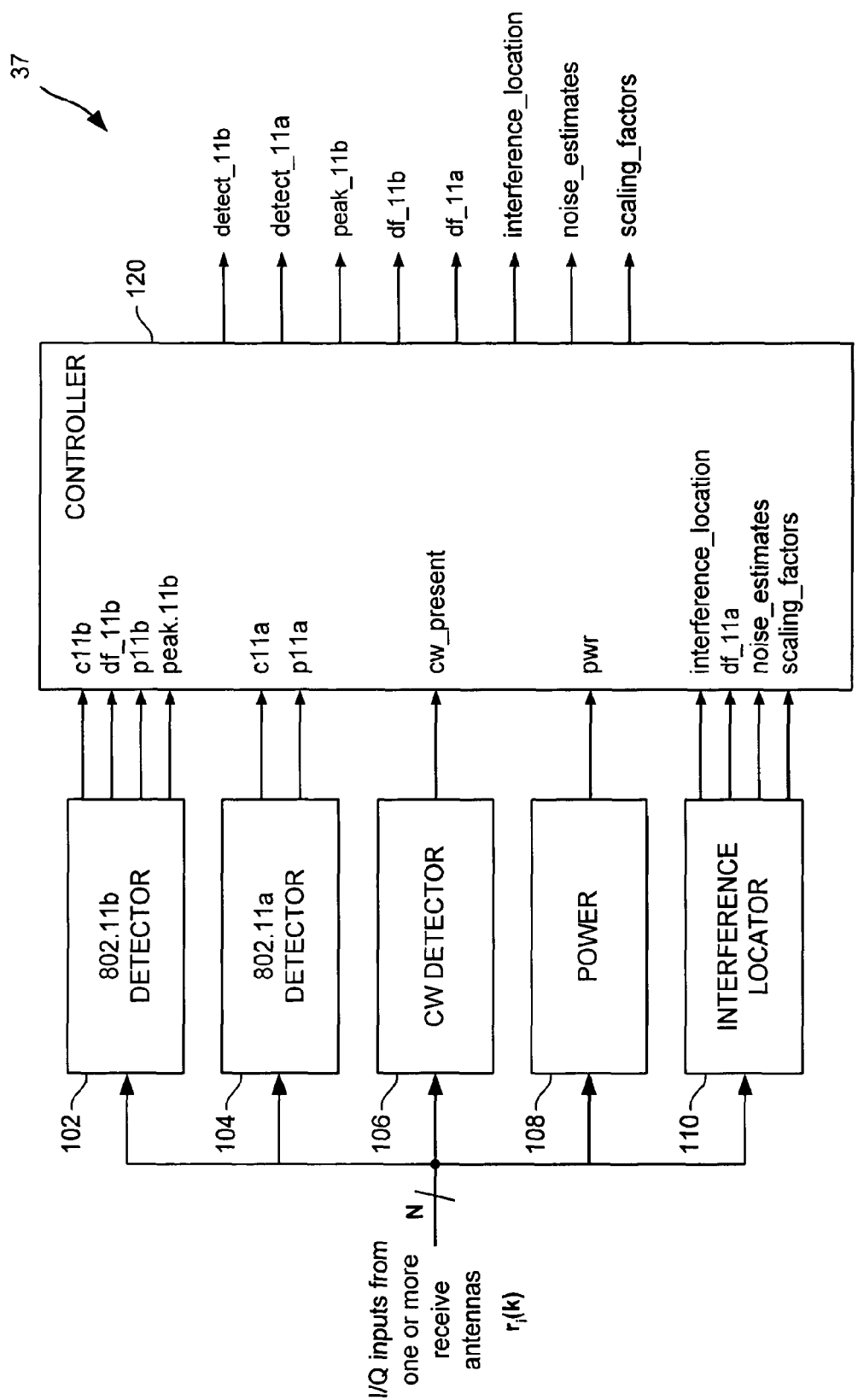
FIG. 4 is a block diagram of portions of a receiver including packet detection elements as might be used in the receive section of FIG. 3.

FIG. 4 illustrates joint packet detector 37 in greater detail. As shown there, I and Q inputs from one or more receive antennas are inputs to several detection blocks comprising 802.11b detector 102, 802.11a detector 104, CW detector 106, power level detector 108 and interference locator 110, each of which are described below in greater detail. The outputs of the detection blocks are provided to a controller 120 that provides outputs for use by the receiver. In some embodiments, some of the functions described here as being done by controller 120 might instead be performed by the individual blocks. In some embodiments, additional detectors are provided for other subsections, such as an 802.11 extended subsection.

The outputs of the blocks that are inputs to controller 120, in the embodiment shown in FIG. 4, are as shown in Table 1. The outputs of controller 120, in the embodiment shown in FIG. 4, are as shown in Table 2.

TABLE 1

Controller Inputs

| Label | Description |
|---|---|
| c11b | Correlation metric for 802.11b |
| df_11b | Coarse estimate for transmitter/receiver frequency offset for 802.11b signals |
| p11b | Power metric for 802.11b |
| peak11b | Index of 802.11b signal peak |
| c11a | Correlation metric for 802.11a |
| p11a | Index of 802.11b signal peak |
| cw_present | Indicates presence of a narrowband interference signal that is not 802.11a or 802.11b |
| pwr | Power estimates for each antenna |
| interference-location | Frequency location of detected interference (if any) |
| df_11a | Coarse estimate for transmitter/receiver frequency offset for 802.11a signals |
| noise_estimates[N] | Estimates (per antenna) of noise level |
| scaling_factors[N] | Estimates (per antenna) of noise level; used for adjusting gain of antennas |

The coarse estimate for transmitter/receiver frequency offset could be calculated elsewhere, but when calculated in interference locator 110, any narrowband interference can be easily removed from the signal prior to determination of a frequency offset with much less sensitivity to narrowband interference. Typically, the narrowband interference is "removed" by filtering out the sub-carriers surrounding detected narrowband interference.

The cw_present and pwr signals might be used by controller 120 as an indication of the presence of a strong narrowband interferer, in which case any 802.11a or 802.11b packet detection determinations are ignored as most likely being false alarms.

TABLE 2

Controller Outputs

| Label | Description |
|---|---|
| detect_11b | A metric indicating the presence of an 802.11b preamble |
| detect_11a | A metric indicating the presence of an 802.11b preamble |
| peak11b | Passthrough from interference locator |
| df_11b | Passthrough from interference locator |
| df_11a | Passthrough from interference locator |
| interference-location | Passthrough from interference locator |
| noise-estimates[N] | Passthrough from interference locator |
| scaling_factors[N] | Passthrough from interference locator |

Although controller 120 appears dedicated to the detection blocks in FIG. 4, controller 120 might be so dedicated or it might handle other functionality that controls other, unshown, functions or processes. Some functions of controller 120 are described below with reference to the blocks that generate inputs to controller 120. For example, the "detect_11a" signal is described below in the description of how the 802.11a metrics are generated. The passthrough signals are used by other blocks, such as 802.11a or 802.11b subsections and need not be used by controller 120 itself.

In some implementations, signals that are indicators (detect_11a, detect_11b, cw_present, etc.) might be binary signals, but in other implementations, the signals can be multilevel, indicating a probability, confidence or certainty value (e.g. degree of certainty) associated about what has been indicated. For example, detect_11a might have a signal value that indicates a 70% probability that an 802.11a packet is being received. In the end, however, a binary decision needs to be made as to whether or not to start the 802.11a/b subsections, so the indicators would be expected to ultimately reduce to binary signals.

802.11b Detection

Figure 5:
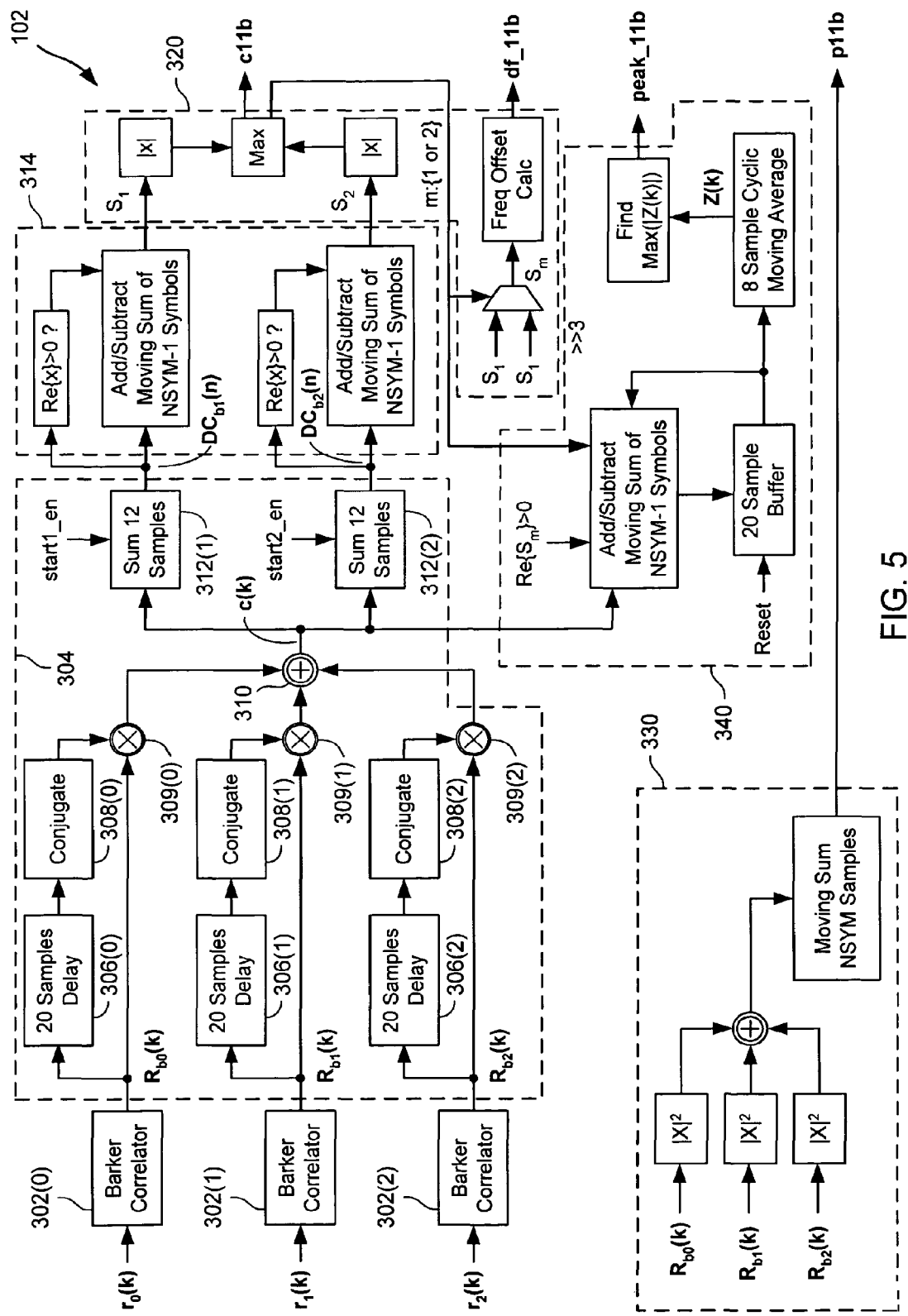
FIG. 5 is a block diagram of an 802.11b packet detector as might be used in the receiver of FIG. 4.

The preamble of an 802.11b packet comprises sync bits that do not contain data. The preamble portion of the signal is used to detect the presence of the packet and then to estimate signal and channel parameters. FIG. 5 illustrates one implementation of 802.11b packet detector 102. In this implementation, packet detection is done by correlating inputs and checking the resulting correlation. Detector 102 can provide a pair of metrics c11b (correlation metric for 802.11b) and p11b (power metric for 802.11b), for use by controller 120 in formulating detect_11b or detector 102 might provide a single metric that is a function of c11b and p11b, such as p11b/c11b or other variations. As an example of using the metrics to make a detection decision, a packet might be deemed detected when Equation 1 is true for some threshold, T_11b.

$$\frac{c11b}{p11b} > T\_11b \qquad \text{Equation 1}$$

If the number of symbols over which c11b is generated is different than the number of symbols over which p11b is generated, those values might be taken into account, as illustrated by Equation 2.

$$\frac{c11b/(NSYM-1)}{p11b/nsym} > T\_11b \qquad \text{Equation 2}$$

The threshold inequality of Equation 2 normalizes c11b by NSYM−1, wherein NSYM is a fixed constant indicating a maximum number of symbols (a symbol being 20 samples, which is one Barker code) used for calculations, and normalizes p11b by nsym, where nsym is equal to the lesser of NSYM and the number of symbols that have been received since the last reset of the detector. In one embodiment, T_11b=0.4 and NSYM=10. In a noise-free case, where each 20-sample symbol is an exact copy of the previous group of 20 samples, the left-hand side of Equation 2 evaluates to 1 when nsym=NSYM.

Because c11b is based on differential correlations, the number of addends used to calculate c11b is one less than the number of symbols available. For example, if nsym=3 (60 samples), c11b would be based on two differential correlations (one between the first two symbols and one between the last two symbols). The normalization factor could be nsym−1, but then false alarms might be more common when nsym is much smaller than NSYM. The number of addends used for calculating p11b is the same as the number of symbols, instead of being one less than the number of symbols, so p11b is normalized using nsym to get the average power per symbol.

In one possible process and apparatus for generating the metrics, the input signals from N receive antennas are used. The receiver input signals are represented in FIG. 5 and elsewhere as $r_i(k)$ where i=0, 1, 2, ..., N−1. Unless otherwise indicated or apparent, signals can be complex signals and operations such as addition and multiplication can be complex operations.

The input signals run through Barker correlators 302, one per antenna. One advantage of the approach described here is that where an incoming signal is processed to detect packets, much of the processing can be duplicated since the signal is sampled at a common sampling rate. We have determined that sufficient accuracy can be had detecting 802.11b packets even with a sampling rate of 20 MHz. Of course, once a packet is detected and it is found to be an 802.11b packet, the sampling rate might be changed to 22 MHz to operate at the natural 802.11b sampling rate. Other variation of sampling processes might work in other situations, such as sampling at 22 MHz for both detections, sampling at a multiple of, or an even a fraction of 20 MHz or 22 MHz, or even at a rate that is not a multiple or even fraction of 20 MHz or 22 MHz.

In the implementation shown, Barker correlators 302 operate at a sample rate of 20 MHz, even though 802.11b signals are generated at 22 MHz. To accomplish a Barker correlation, there are 20 taps corresponding to a Barker code sampled at 20 MHz instead of 11 taps sampled at 11 MHz, thus the 20-tap Barker code is a re-sampling of the 11-tap Barker code. For example, a 20-tap re-sampled and quantized sequence might be "0, 3, −2, −2, 3, 1, 3, 0, −4, 1, 3, 0, 3, 0, 2, −3, 0, −4, 0, −4" but any other properly re-sampled Barker sequence with some arbitrary delay shift will do. Using the re-sampled Barker sequence, the whole packet detector can operate at a 20 MHz sample rate and some of the processing done on the inputs for 802.11a detection can be used as well for 802.11b detection and for generating ancillary and/or passthrough signals. The outputs of the Barker correlators are represented by $R_{bi}(k)$. Note that other modified Barker sequences might be used instead of the one described above.

The output of each Barker correlator 302 is processed to determine two differential correlations, $DC_{b1}(n)$ and $DC_{b2}(n)$. As shown in Equations 3-4, the outputs of Barker correlators 302 are differentially correlated, in that the correlation output is multiplied by a delayed and conjugated correlation output. The differential correlation is done by correlation block 304.

As shown, correlation block 304 comprises delay lines 306, conjugators 308 and multipliers 309 (one per antenna) as well as an adder 310 and two accumulators 312 (one per differential correlation. The inputs to adder 310 are the Barker correlator outputs from each of the antennas, each multiplied by a version of itself, delayed and conjugated. The output of adder 310, labeled "C(k)" in FIG. 5, is provided to accumulators 312 which, in this example, accumulate twelve values for C(k).

Figure 6:
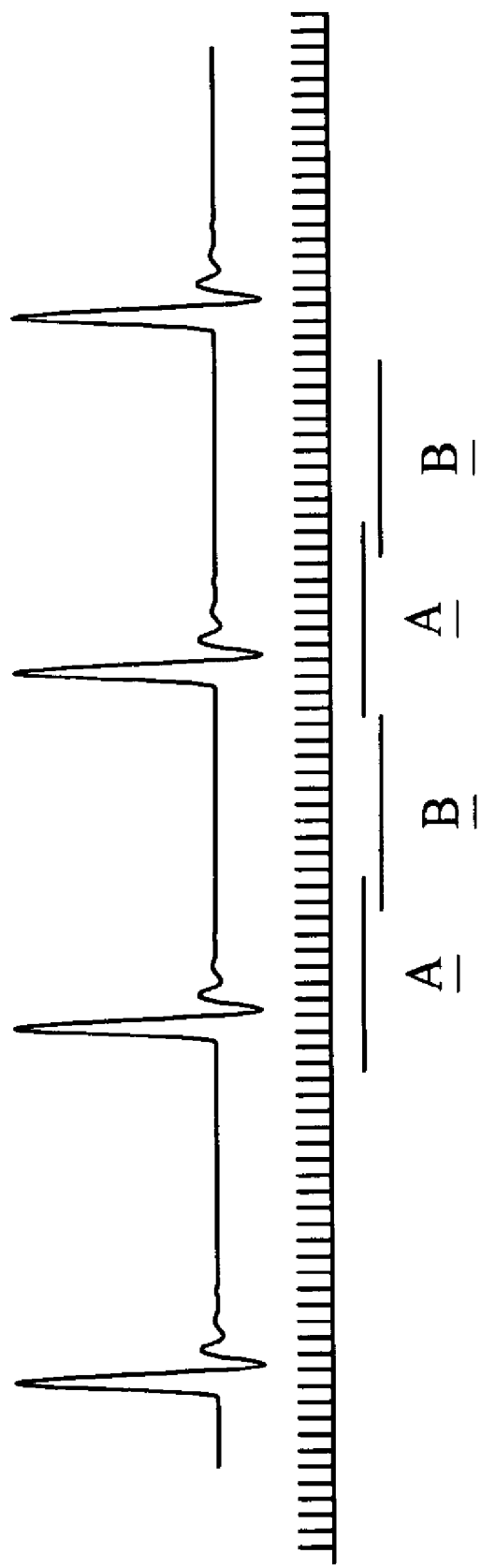
FIG. 6 graphically illustrates correlation sampling.

The number of values accumulated might be larger than twelve, but at the cost of a decreased SNR performance. Smaller numbers of values will give significant SNR degradation. One reason for these effects is illustrated by FIG. 6, showing a real portion of an example of the correlation output. In practice, the signal would likely be a complex signal with an arbitrary unknown phase offset and frequency drift, but to keep the example simple, only the real portion is shown. The differential correlation provides two outputs, one comprising the correlation of the interval A, and one comprising the correlation of the interval B. The differential correlation eliminates any phase offset and converts a frequency offset into a fixed phase offset in the differential output, which then can be summed over multiple symbols to enhance the SNR. In the example, it can be seen that most of the signal power is concentrated in the A interval.

The overlap between the A and B intervals reduces the SNR loss that happens when the pulses occur exactly at the boundary of the A and B intervals. Without an overlap, the SNR loss would be 3 dB, and intervals of twelve samples provide a suitable overlap. For larger numbers, the overlap is larger and that causes an SNR penalty because noise-only samples in between the signal pulses are included in the correlation. The choice of an interval that is slightly larger than half the symbol duration gives close to 3 dB gain over using a full symbol interval.

It is also possible to use more than just two intervals. For instance, one could use four intervals, each with a size slightly over a quarter symbol and a resulting overlap, for even larger SNR improvements in small delay spread cases, where most of the signal power is concentrated in a small interval.

The particular twelve (or however many) values for each accumulator are determined by their respective enable inputs. As shown in FIG. 5, accumulator 312(1) is enabled by the start1_en signal and accumulator 312(1) is enabled by the start2_en signal. As illustrated by Equations 3-4, start1_en enables accumulator 312(1) for samples 1 through 12 and start2_en enables accumulator 312(2) for samples 11 through 22 (samples 21-22 are just samples 1-2 of the next symbol).

The processing of correlation block 304 is shown in Equations 3 and 4 below, where the superscripted "*" refers to a conjugate, the multiplication is complex multiplication and n refers to the symbol number (an integer).

$$DC_{b1}(n) = \sum_{k=1}^{12} \sum_{i=1}^{N} R_{bi}(20*n+k) * R_{bi}(20*n+k-20)$$ Equ. 3

$$DC_{b1}(n) = \sum_{k=11}^{22} \sum_{i=1}^{N} R_{bi}(20*n+k) * R_{bi}(20*n+k-20)$$ Equ. 4

In this description, i refers to the antenna number where $I=0, 1, 2, \ldots, N-1$ for some N. $N=3$ in the example shown in FIG. 5, but N could be one, two or more than three. In this description, k refers to the sample number, where $k=1, 2, \ldots, S$ for some S. $S=22$ in this example, for 802.11b detection as 20 samples exist per symbol (plus two for the overlap).

The differential detection (multiplication of each sample by a conjugated sample in a corresponding position in a previous symbol) that is present in Equations 3 and 4 tends to eliminate the effect of any frequency offset. Note that the differential correlations $DC_{b1}(n)$ and $DC_{b2}(n)$ are taken over overlapping parts of a symbol (e.g., the 11th and 12th sample appear in both sums). This ensures that there is always one differential correlation with maximum signal power and minimal ISI regardless of data transitions in 802.11b signals.

In 802.11b signals, there are sign inversions caused by data modulation in the 802.11b preamble. To remove this effect, the differential correlations are multiplied by the signs of their real values and are then accumulated over several symbols, in block 314. The accumulation is a moving sum, wherein the moving sum, $S_1$, for $DC_{b1}(n)$ is the sum of the most recent NSYM−1 symbol values for some integer NSYM. A preferred value for NSYM=10 and less than NSYM−1 values might be used if fewer than NSYM−1 symbols are available since the last reset of the detector. The same is done for the moving sum $S_2$ corresponding to $DC_{b2}(n)$.

Once the two moving sums are available, a comparator block 320 determines which moving sum has the higher absolute value and outputs that moving sum's absolute value and an index indicating whether the first or second moving sum was selected. The selected output sum is the metric c11b described above. As described above, that metric is used along with the power metric to determine whether an 802.11b packet is detected. The power metric p11b is calculated by summing over all N antennas (or all the active antennas) the squares of the absolute values of each Barker correlator 302 output and gathering a moving sum over NSYM symbols.

Using the above-described method of 802.11b packet detection, or another method, once an 802.11b packet is detected, the phase of the selected (maximum) moving sum value is used as an estimate, df_11b, for the frequency offset. If an 802.11b packet is detected, another value, peak11b, is also calculated, indicating which sample number is the signal's peak. In particular, peak block 340 operates on the index indicating the selection of one of the two moving sums and on the output of the summation of differential detection.

Peak block 340 sums the samples for NSYM−1 symbols from adder 310 in a moving sum. The moving sum from comparator block 320 is then added (or subtracted if the selected moving sum was inverted in processing block 314 to account for sign inversions) and then accumulated over 20 samples. From that, an 8-sample cyclic moving average of the most recent NSYM−1 differentially detected correlator outputs is taken. For example, suppose the correlator outputs for each of 20 samples are stored in the sample buffer and for each symbol the outputs are accumulated so that each of the values in the sample buffer is an accumulation for a different one of the sample positions. Thus, the first value in the sample buffer is an accumulation of up to NSYM−1 correlations for the first sample of a symbol (or the sample assigned to be the "first" sample). If the contents of the sample buffer are, for example, {8, 4, 1, 1, 2, 0, 0, 0, 0, 0, 0, 0, 0, 0, 0, 0, 0, 6, 2, 2} then the cyclic moving average for a sample k is the average of the samples starting at the k-th entry. In the example above, k=18 yields the highest value, since the average of the eight values starting at sample 18 is larger than any other consecutive eight values (the eight values starting at sample 18 are samples 18-20 and samples 1-5). The maximum value of the samples is used as the peak and peak block 340 outputs the index for that value (e.g., the value "18" for the above example), to be used as an 802.11b symbol timing reference, or for other purposes.

802.11a Detection

Figure 7:
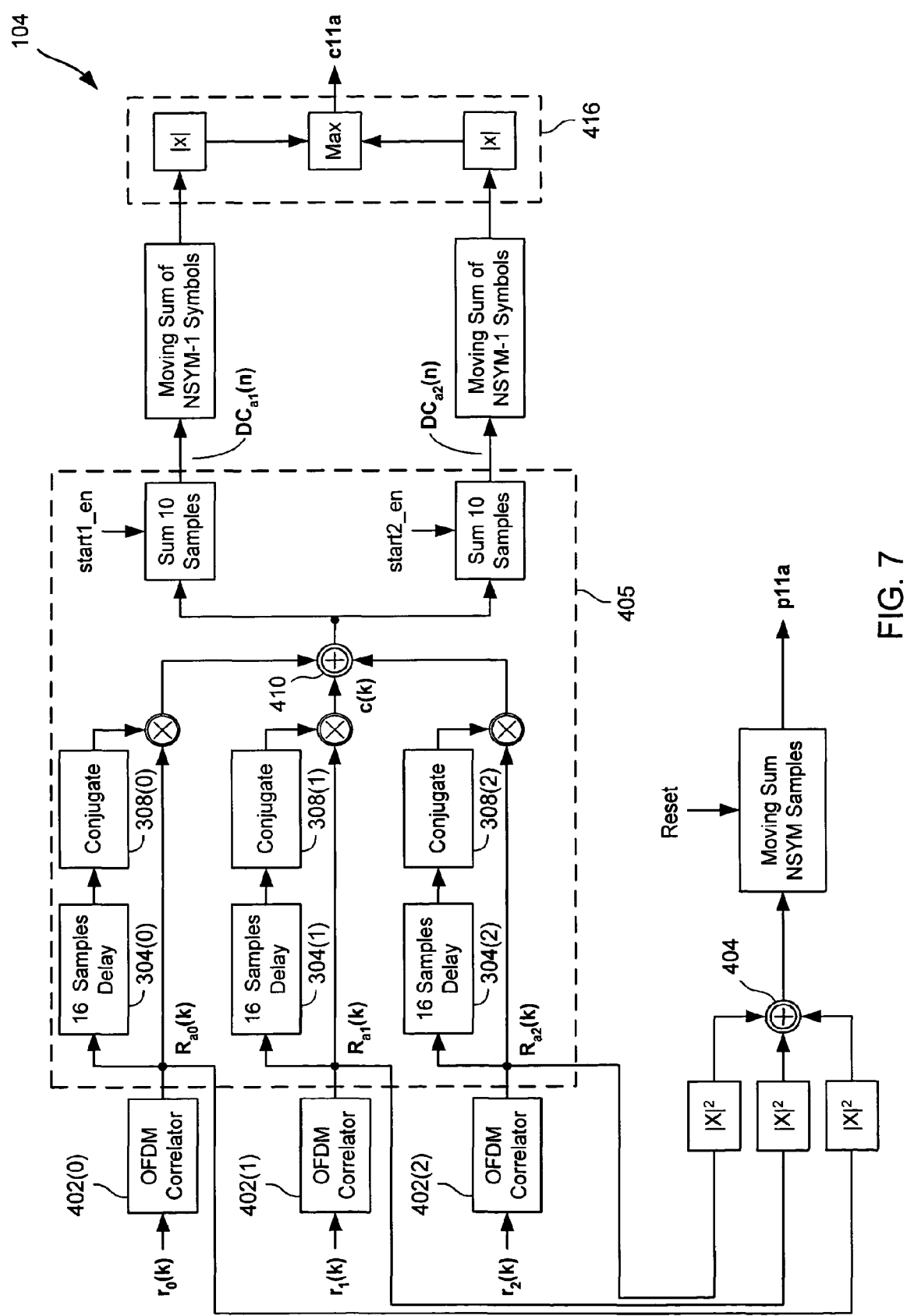
FIG. 7 is a block diagram of an 802.11a packet detector as might be used in the receiver of FIG. 4.

FIG. 7 is a block diagram of 802.11a detector 104. The basis of the packet detection is a correlator that correlates the input signals with a 16-sample 802.11a short training symbol. After the correlators, a differential detection is performed to eliminate the effect of a frequency offset between the transmitter clock and receiver clock. Then, the differentially detected correlation outputs are accumulated over several symbols. A correlation might be done using a fixed pattern correlated against the signal received rather than differentially correlated with the signal, with one or more receive antennas, but for low SNR signals, differential correlation often provides better results.

In one possible process and apparatus for generating 802.11a metrics, the input signals from N receive antennas are run through OFDM correlators 402. In FIG. 7, an input signal is represented as $r_i(k)$ and the output of a corresponding OFDM correlator 402 is represented as $R_{ai}(k)$, for the k-th sample from the i-th antenna. The absolute values of the squares of the $R_{ai}(k)$ are summed by an adder 404 and then summed over the most recent NSYM samples to arrive at a power level metric p11a.

The output of each OFDM correlator 402 is then processed to determine two differential correlations by multiplying each OFDM correlator output with a delayed version of itself to form differential detections that are then summed over all OFDM correlators (i.e., over all antennas), by another adder 410. Using a correlation block 405 as shown in FIG. 4, this would result in the processing shown in Equations 5 and 6 below, where the superscripted "*" refers to a conjugate, the multiplication is complex multiplication, n refers to the symbol number (an integer) and $S=18$ for 802.11a detection (16 samples per symbol, plus two overlaps).

$$DC_{a1}(n) = \sum_{k=1}^{10} \sum_{i=1}^{N} R_{ai}(20*n+k) * R_{ai}(20*n+k-16)$$ Equ. 5

$$DC_{a2}(n) = \sum_{k=9}^{18} \sum_{i=1}^{N} R_{ai}(20*n+k) * R_{ai}(20*n+k-16)$$ Equ. 6

The differential correlations are taken over overlapping parts of a symbol. This ensures that there is always one differential correlation with maximum signal power. Once these differential correlations, $DC_{a1}(n)$ and $DC_{a2}(n)$, are computed, moving sums of these values are obtained over NSYM−1 symbols (or fewer if the detector is recently reset), using accumulators 414. The moving sums are then compared to determine which one has the maximum absolute value (in comparison block 416) and the larger absolute value is output as the c11a metric signal. Where less than NSYM−1 symbols are available since the last reset of detector 104, the moving sum is over the samples (of symbols) received.

In one embodiment, controller 120 indicates, via signal detect_11a, whether an 802.11a packet is received. One binary indicator is whether or not Equation 7 is satisfied for some threshold T_11a and some threshold T_11ab. In one embodiment, NSYM=6, T_11a=0.4, and T_11ab=0.5.

$$\frac{nsym * c11a}{(NSYM-1)*p11a} > T\_11a \qquad \text{Equ. 7}$$

AND $$\frac{c11a}{c11b} > T\_11ab$$

In some embodiments where detect_11a is a multilevel signal, detect_11a might be a measure proportional to that shown in Equation 8 when c11a/c11b>T_11ab.

$$\text{detect\_11}a = \frac{nsym * c11a}{(NSYM-1)*p11a*T\_11a} \qquad \text{Equ. 8}$$

CW Detection

The 802.11a and 802.11b detectors give excellent performance in additive white Gaussian noise, but they typically will not discriminate well between desired packets and narrowband interference, such as Bluetooth signals and other forms of interference. False triggers are undesirable because false detection might cause other processing to start that does not include listening for a packet start and a true packet start might be missed while the receiver was processing the false start and before the receiver fails on the false start and resets. To prevent false triggers on narrowband interference, a narrowband interference detection circuit is used. On example of one such component is shown in FIG. 8.

A CW detection is done preferably each time one of the packet detectors 102 or 104 indicates a packet has been detected. It can be done at the same time as other processing, or on a buffered set of samples only after packet detection has occurred.

Narrowband interference detection can be done on a single active antenna, to minimize the hardware complexity. Since the primary goal is to detect strong interference when there is no desired signal, it is not expected that using more than one antenna will significantly improve the performance of this step. However, it is possible to use more than one antenna.

Figure 8:
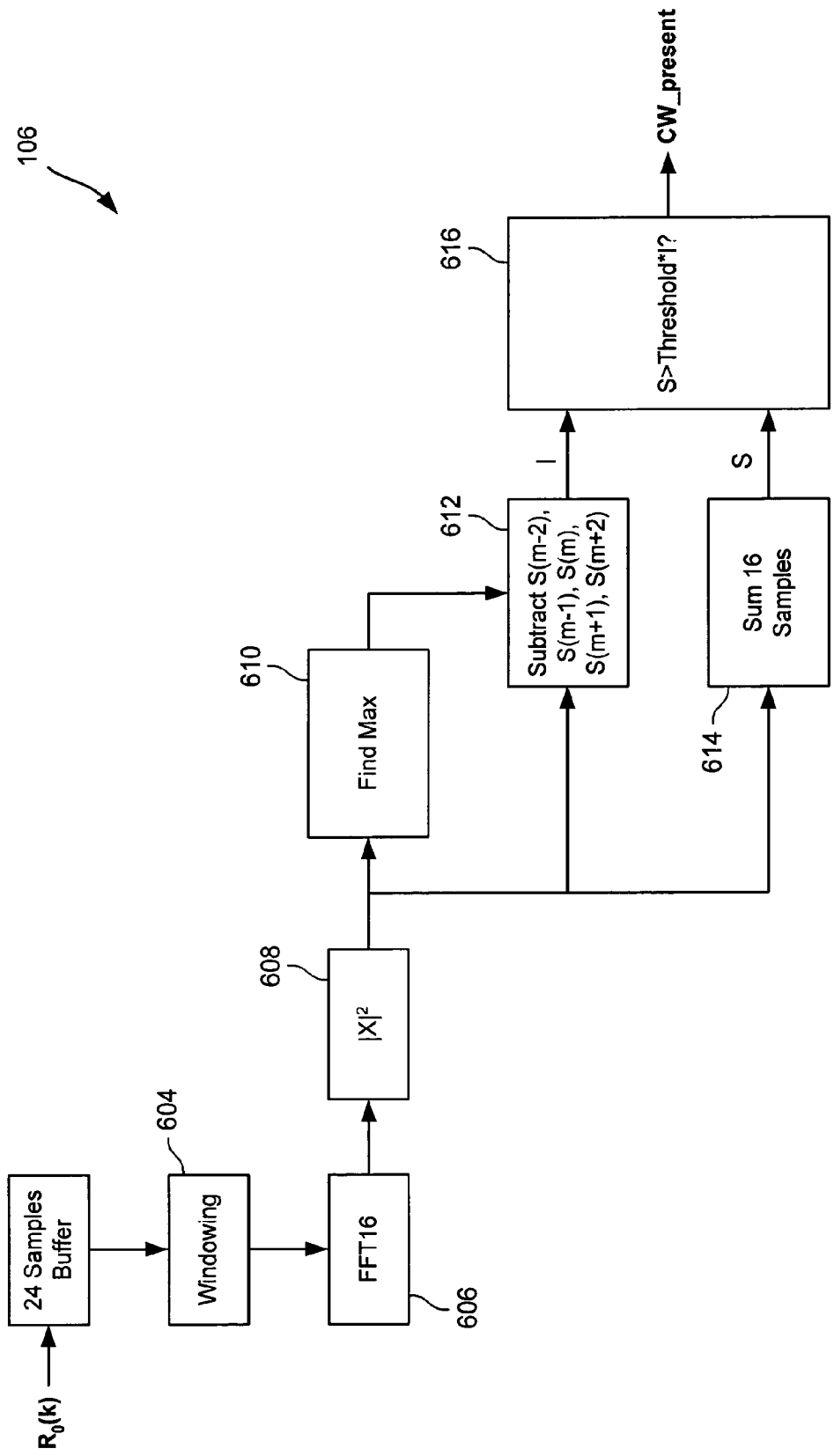
FIG. 8 is a block diagram of a continuous wave (CW) detector as might be used in the receiver of FIG. 4.

As illustrated by the components shown in FIG. 8, the input signal is buffered so that the last 24 samples used by the packet detectors are available. A window filter 604 is applied to the 24 samples wherein a raised cosine window with a rolloff length of 8 samples is applied to the first 8 samples and the last 8 samples. This tends to minimize "leakage" of narrowband interference power into adjacent FFT-outputs, thereby increasing the detection probability. However, other window schemes might be used instead. Window filter 604 also "folds" over samples to result in a 16-sample set, by adding samples 1-4 to samples 17-20 and samples 21-24 to samples 5-8. In some implementations, the effects of window filter 604 are determined ahead of time and a set of 16 functions of the inputs are determined and applied to the 24 inputs to obtain the 16 values for the output of window filter 604.

However, the window filter outputs are obtained, a 16-sample FFT 606 does an FFT on its window filter outputs and provides that to a power detector 608 and a maximum detector 610. Maximum detector 610 determines which of the FFT output samples, (the m-th sample) has the maximum power.

Further processing is performed by blocks 612 and 614. Where the combined power of the m-th sample and two samples on each side of the m-th sample is larger than a threshold times the power of all of the samples (or "the other samples"), narrowband interference is assumed and the CW_present signal is asserted. When controller 120 receives the CW_present signal, 802.11a or 802.11b triggers are ignored. While the CW_present signal can be binary, it can also be multilevel, indicating a probability, confidence or certainty value (e.g. degree of certainty) associated with the determination.

The above technique is usable for a single antenna, even where multiple antennas are available. Where multiple antennas are available and used, multiple instantiations might exist for FFT 606 and power detector 608, with the outputs of multiple FFTs feeding to the multiple power detectors and the outputs of the power detectors added together.

Power

In some implementations, not all antennas are used in order to save power where power savings is more important than getting the better performance using all antennas. The antennas that are used are referred to herein as "active" antennas. Power component 108 estimates received signal power per antenna, which is used for automatic gain setting (AGC) of the RF receivers. A change to the RF gain is made in each of the 3 following cases:

1) when one I or one Q sample of one of the active antennas clips: in this case, the RF gain of all active antennas is reduced by a coarse gain step (20 dB, for example);

2) when the total power of all active antennas is below some threshold: in this case, the RF gain of all active antennas is increased by the coarse gain step (typically the up step and the down step are the same, but they could be different);

3) when a packet is detected: in this case, a power adjustment is made based on the estimated power averaged over the last 32 samples.

The power of all active antennas might be adjusted in steps of 4 dB such that the resulting backoffs become approximately equal to some target backoff and the gain might be changed after every packet detection. Non-active antennas are set to a larger backoff level to prevent clipping that can happen if these antennas happen to have a significantly larger power than the active antennas. When more than one active antenna is used in the AGC, a programmable parameter limits the maximum gain differences between different antennas.

This is done to prevent an antenna that receives only noise to be blown up too much, since that may cause problems for the 802.11b receiver training or other situations.

Although FIG. 4 shows only a "pwr" output from power component 108, power component 108 might also output gain settings for each antenna. For example, once a packet is detected, controller 120 might send the gain settings (and possibly also the pwr settings) to an RF receiver to update its gain settings.

Interference Location

Interference locator 110 provides additional information to assist a receiver. Such information includes the frequency location of possible narrowband interference, the coarse frequency offset (df-11a) between the transmitter and receiver for 802.11a signals, signal power and noise power. FIG. 9 shows one possible circuit (comprising components 110A, 110B and 110C) for determining such location and other indicators.

Figure 9A:
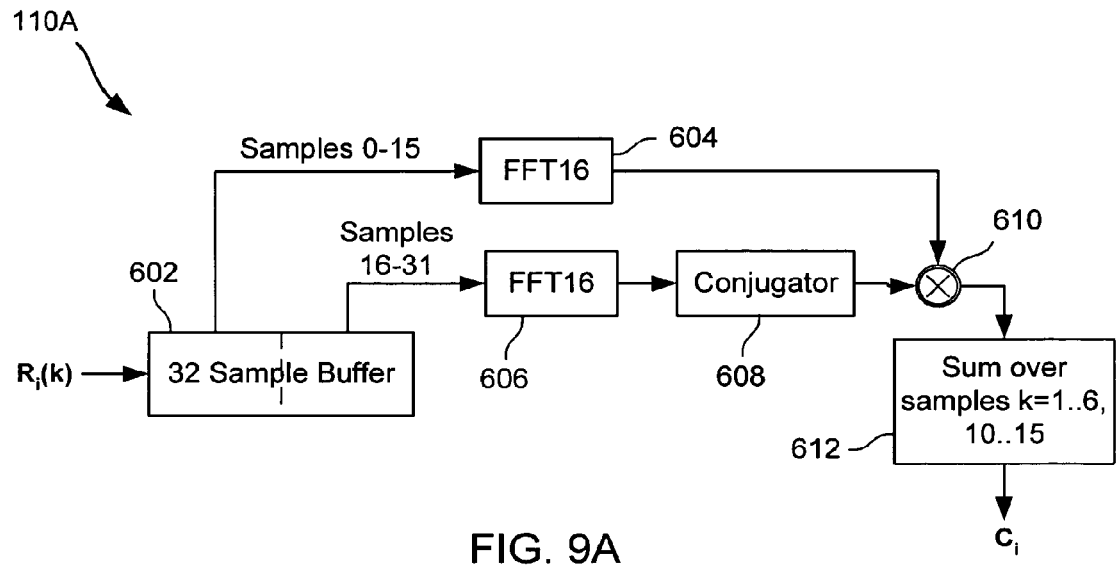
FIG. 9 is a block diagram (comprising 9A, 9B, 9C) of an interference detector as might be used in the receiver of FIG. 4.

As shown there, 32 samples from each antenna are processed to determine the indicators. The samples are obtained from a sample buffer 602. Although only one circuit is shown in FIG. 9A, is should be understood that the circuit is shown for the i-th antenna and multiple instances would be present for multiple antenna receivers. Alternatively, the circuit could be used in series for more than one antenna (such as where the circuit is implemented by instructions for a digital signal processor), but where performance is an issue, one circuit might be dedicated to one antenna and all the circuits implemented in dedicated hardware, such as a custom ASIC.

From the 32 samples in sample buffer 602, an FFT block 604 performs an FFT on the first 16 samples and an FFT block 606 performs an FFT on the second 16 samples, to form frequency signals $F_{ib}(k)$ and $F_{ia}(k)$, where k represents one of sixteen subcarriers k=0 . . . , 15. The output of FFT block 606 is conjugated by a conjugator 608 and the outputs of FFT block 604 and conjugator 608 are multiplied by a complex multiplier 610 to form a multiplier output $Z_i(k)$. An accumulator 612 sums the multiplier output over twelve of the samples (k=1 . . . 6, 10 . . . 15) to form a correlation output $C_i$ The particular samples used in the example are based on the short training subcarriers present in the first eight microseconds of an 802.11a preamble. For variations of this process, other samples (or less than all of the ones used in the example) might be used. The k=0 subcarrier is not used, as it is the DC-component.

Figure 9B:
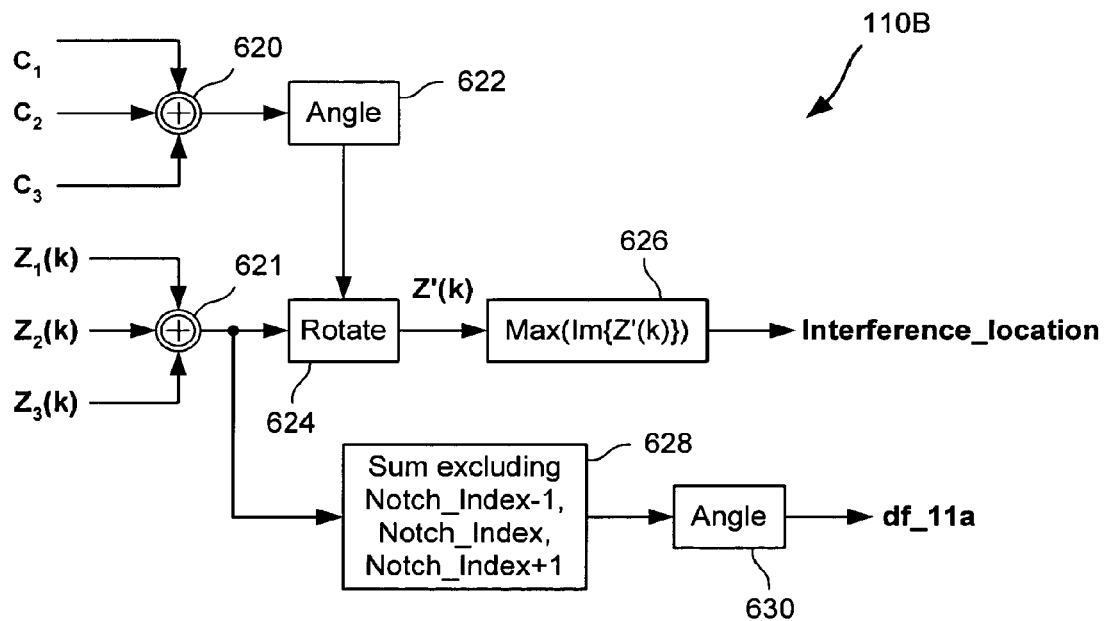
Figure 9C:
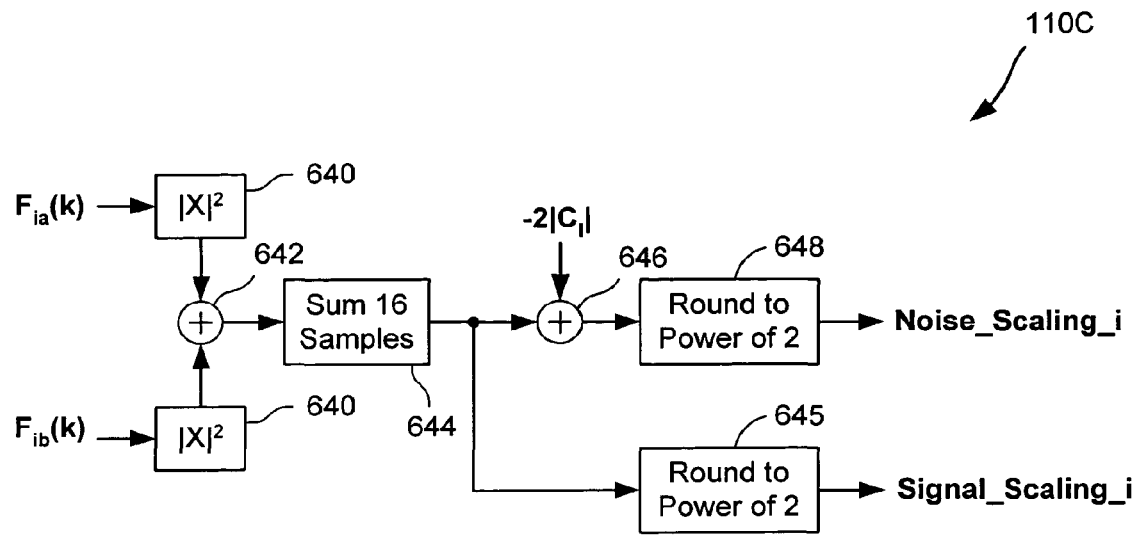

In the example shown in FIG. 9, the number of antennas is N=3, so component 110A might be instantiated three times, producing values for $F_{1b}(k)$, $F_{1a}(k)$, $Z_1(k)$, $C_1$, $F_{2b}(k)$, $F_{1a}(k)$, $Z_2(k)$, $C_2$, $F_{3b}(k)$, $F_{3a}(k)$, $Z_3(k)$ and $C_3$. Those values are then used by components 110B and 110C as shown in FIGS. 9B and 9C, respectively.

As shown in FIG. 9B, the correlation output values for all antennas processed are accumulated by an accumulator 620 and an angle is calculated by angle block 622, which is the angle of the complex value output by accumulator 620. The multiplier output values for all antennas processed are summed by another adder 621. The output of angle block 622 and adder 621 are used by a rotation block 624 to determine a phase corrected value Z'(k) that is equal to the input samples Z(k) rotated by the angle found by block 622.

A maximum detection block 626 receives Z'(k) and outputs the maximum quadrature value as the subcarrier that represents the interference location output. Blocks 628 and 630 provide the coarse frequency offset df_11a, from a sum of the multiplier output values excluding the subcarrier corresponding to the interference location and its neighbors (one on each side).

Component 110C shown in FIG. 9C is for one antenna (or multiple antennas where it could be used in that way), the i-th antenna. As shown there, the frequency signals $F_{ib}(k)$ and $F_{ia}(k)$ are provided to magnitude blocks 640 that output the power of each of the frequency signal (or at least a proportional representation of the power) and those power signals are added by adder 642. An accumulator 644 sums the results over 16 samples. The accumulator result is rounded to a power of 2 by a rounder 645 and the output of rounder 645 is a signal scaling factor for the i-th antenna. The accumulator result is also used for noise scaling, wherein an adder 646 subtracts twice the absolute value of the correlation output value $C_i$ for the i-th antenna from the accumulator result. Another rounder 648 rounds the result from adder 646 to a power of 2 and that is provided as a noise scaling factor for the i-th antenna. The signal strengths and noise scaling factors can be used for multiple antenna combining.

When interference and a valid packet are detected, the interference might be removed and the packet processed to obtain data, but if there is interference detected and no valid packet detected, nothing else need be done. Narrowband filtering can be done using the interference location, such as by filtering the signal using a band-gap filter at the interference location. Another approach is to pass values to a Viterbi decoder indicating a low confidence in values measured at the frequency of the interference. The interference detection can be used in other components of a receiver other than the packet detector. For example, interference location is usable in a synchronization process to ignore spurious signals.

Experimental Results

FIG. 10 illustrates some experimental results using the above circuits for detection and producing indicators. Each of these plots is for a single active antenna and plot probabilities versus threshold values, with additive white Gaussian noise.

Figure 10A:
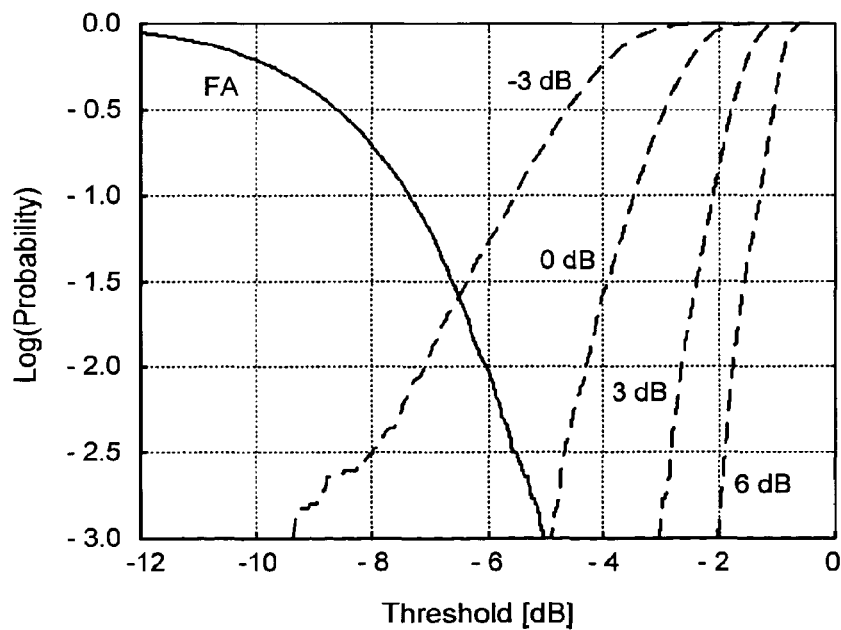
FIG. 10A shows 802.11a detection curves.

FIG. 10A illustrates 802.11a packet detection results including false alarms (packet not present, but packet detected) and missed detections (packet present, but packet not detected). The curve labeled "FA" represents the probability that, during a single symbol interval, a packet is falsely detected. The other curves are missed detection curves, for the signal to noise ratios indicated by the labels (−3 dB, 0 dB, 3 dB and 6 dB). In practice, a detection decision is made every symbol duration, so the probability of a false alarm within a certain number of symbols is larger than the probability shown in FIG. 10A. Since a false alarm can lead to missed detection, because the receiver would then be "deaf" to incoming packets for a certain time, it is important to select a detection threshold with sufficiently small false alarm probability. A reasonable threshold value is 4 dB for 802.11a.

Figure 10B:
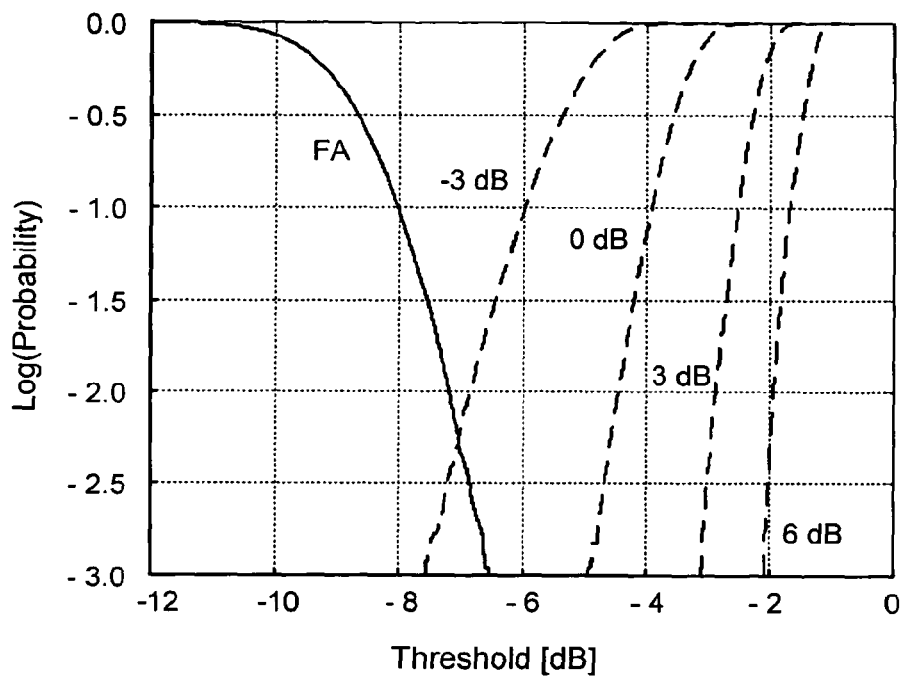
FIG. 10B shows 802.11b detection curves

FIG. 10B illustrates 802.11b packet detection results including false alarms and missed detections, using similar notations and SNR values as with FIG. 10A. As with 802.11a detection, the probability of a false alarm within a certain number of symbols is larger than the probability shown in the figure and a detection threshold should be selected for a sufficiently small false alarm probability. A reasonable threshold value is −5 dB for 802.11b.

Figure 10C:
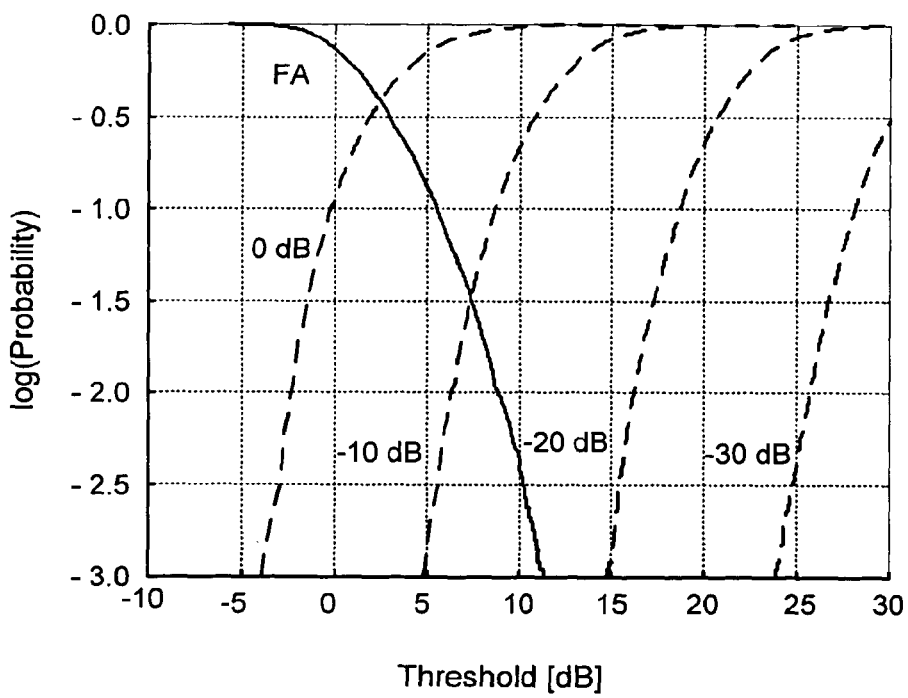
FIG. 10C shows CW interference detection curves.

FIG. 10C illustrates CW interference detection curves. The solid curve labelled "FA" represents the false alarm probability, wherein CW interference is detected on an OFDM preamble with 250 ns delay spread. A false alarm means that a valid OFDM preamble will be rejected even though it could have been received without interference. The dashed lines represent missed detection probabilities for signal-tointerference ratios of 0 dB, 10 −10 dB, −20 dB and −30 dB as indicated.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A packet detector for detecting data packets of a first format and a second format, the packet detector comprising:
   inputs from a plurality of antennas configured to receive different signals, the inputs coupled to an analysis circuit, a first subsection, and a second subsection;
   wherein the analysis circuit is configured to determine, for the different signals received from the inputs, that a data packet is present in at least one of the first format or the second format in response to a ratio of a moving sum of a maximum of differential correlations of the different signals to a moving sum of power levels of the different signals meeting a predetermined condition.

2. The packet detector of claim 1, wherein the analysis circuit comprises:
   a correlation circuit configured to determine a correlation metric relating to the first format; and
   power measuring means configured to indicate the power levels of the different signals received over the plurality of antennas.

3. The packet detector of claim 1, further comprising a detector output configured to, based upon the ratio of the moving sum of the maximum of the differential correlations to the moving sum of the power levels meeting the predetermined condition, output a signal indicative of a presence of a data packet in the first format or the second format.

4. The packet detector of claim 3, wherein the first subsection is configured to receive the signal indicating the presence of a data packet in the first format, and based upon receipt of the signal, processes the data packet.

5. The packet detector of claim 3, wherein the second subsection is configured to receive the signal indicating the presence of a data packet in the second format, and based upon receipt of the signal, processes the data packet.

6. The packet detector of claim 3, wherein the analysis circuit operates at a single sampling frequency.

7. The packet detector of claim 6, wherein the single frequency is about 20 MHz.

8. The packet detector of claim 6, wherein the single frequency is about 22 MHz.

9. The packet detector of claim 1, wherein the analysis circuit is configured to determine that the data packet is present in the at least one of the first format or the second format in response to the ratio exceeding a predetermined threshold.

10. An apparatus for detecting data packets of a first format and a second format, the packet detector comprising:
    means for receiving signals from each of a plurality of antennas for receiving different signals, the means for receiving signals coupled to a means for analyzing the different signals, a first means for processing data packets encoded in a first format, and a second means for processing data packets encoded in a second format; and
    the means for analyzing the signals for determining that a data packet is present in the first format or the second format in response to a ratio of a moving sum of a maximum of differential correlations of the different signals to a moving sum of power levels of the different signals meeting a predetermined condition.

11. The packet detector of claim 10, wherein the means for analyzing comprises:
    a correlation circuit for determining a correlation metric relating to the first format; and
    power measuring means for indicating the power levels of the different signals received over the plurality of antennas.

12. The apparatus of claim 10, further comprising means for outputting a signal indicative of a presence of a data packet to the first means for processing data packets encoded in the first format and to the second means for processing data packets encoded in the second format.

13. The packet detector of claim 12, wherein processing by the first means for processing data packets encoded in the first format is performed in response to the signal from the means for outputting indicating that a data packet is present in the first format.

14. The apparatus of claim 12, wherein the second means for processing is configured to receive the signal indicating the presence of a data packet in the second format, and based upon receipt of the signal, processes the data packet.

15. The apparatus of claim 10, wherein the means for analyzing operating at a single sampling frequency.

16. The apparatus of claim 15, wherein the single frequency is about 20 MHz.

17. The apparatus of claim 15, wherein the single frequency is about 22 MHz.

18. A computer-readable non-transitory storage medium comprising computer-executable instructions that, in response to execution by a computing system, cause the computing system to perform operations, comprising:
    receiving a plurality of signals over a plurality of antennas;
    providing the plurality of signals to a first subsection for processing data packets encoded in a first format, to a second subsection for processing data packets encoded in a second format, and to an analysis circuit; and
    analyzing the plurality of signals to determine that a data packet is present in either the first format or the second format including determining that a ratio of a moving sum of a maximum of differential correlations of the plurality of signals to a moving sum of power levels of the plurality of signals exceeds a predetermined ratio.

19. The computer-readable non-transitory storage medium of claim 18, wherein the analyzing the plurality of signals further comprises:
    determining a correlation metric relating to the first format; and
    measuring the power levels of the plurality of signals.

20. The computer-readable non-transitory storage medium of claim 18, further comprising, based upon the determining of the ratio of the moving sum of the maximum of the differential correlations to the moving sum of the power levels exceeding the predetermined ratio, sending a signal indicative of a presence of a data packet to the first subsection or the second subsection.

21. The computer-readable non-transitory storage medium of claim 20, wherein processing by the first subsection is performed in response to the plurality of signals indicating that a data packet is present in the first format.

22. The computer-readable non-transitory storage medium of claim 20, wherein the second subsection being configured to, based upon receiving the signal indicating the presence of a data packet in the second format, processing the data packet.

23. The computer-readable non-transitory storage medium of claim 18, wherein analyzing the received signals includes operating at a common frequency.

24. The computer-readable non-transitory storage medium of claim 23, wherein the common frequency is about 20 MHz.

25. The computer-readable non-transitory storage medium of claim 23, wherein the common frequency is about 22 MHz.

26. A method for detecting data packets of a first format and a second format, comprising:
    receiving a plurality of signals over a plurality of antennas;
    providing the plurality of signals to a first subsection for processing data packets encoded in the first format, to a second subsection for processing data packets encoded in the second format, and to an analysis circuit; and
    analyzing the plurality of signals including determining that a data packet is present in at least one of the first format or the second format including determining a ratio of a moving sum of a maximum of differential correlations of the plurality of signals to a moving sum of power levels of the plurality of signals exceeds a predetermined ratio.

27. The method of claim 26, wherein the analysis circuit operates at a single sampling frequency of about 20 MHz.

28. The method of claim 26, wherein analyzing the received signals comprises:
   determining a correlation metric relating to the first format; and
   measuring the power levels of the plurality of signals.

29. The method of claim 26, further comprising, based upon the determining the ratio of the moving sum of the maximum of the differential correlations to the moving sum of the power levels exceeding a predetermined ratio, sending a signal indicative of a presence of a data packet to the first subsection and the second subsection.

30. The method of claim 29, wherein processing by the first subsection is performed in response to the signal from the detector output indicating the data packet being present in the first format.

31. The method of claim 29, wherein the second subsection being configured for processing the data packet upon the signal indicating the data packet being encoded in the second format.

32. The method of claim 26, wherein the analysis circuit operates at a common sampling frequency.

33. The method of claim 26, wherein the analysis circuit operates at a common sampling frequency of about 22 MHz.

* * * * *